US011930251B2

(12) United States Patent
Goli et al.

(10) Patent No.: US 11,930,251 B2
(45) Date of Patent: *Mar. 12, 2024

(54) ACCELERATED TELEVISION ADVERTISEMENT IDENTIFICATION

(71) Applicant: The Nielsen Company (US), LLC, New York, NY (US)

(72) Inventors: Narasimha Reddy Goli, Tampa, FL (US); Gangadhar Jakkula, Tampa, FL (US); Michael Allen Bivins, San Francisco, CA (US); Thomas A. Potter, Shelton, CT (US); Venkata Lakshmi Kumar Pittu, Tampa, FL (US); Kevin J. Rini, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,222

(22) Filed: Nov. 7, 2022

(65) Prior Publication Data

US 2023/0129733 A1 Apr. 27, 2023

Related U.S. Application Data

(63) Continuation of application No. 17/397,595, filed on Aug. 9, 2021, now Pat. No. 11,496,813, which is a (Continued)

(30) Foreign Application Priority Data

Nov. 26, 2015 (IN) .......................... 3858/DEL/2015

(51) Int. Cl.
*H04N 21/2543* (2011.01)
*G06Q 30/0241* (2023.01)
(Continued)

(52) U.S. Cl.
CPC ....... *H04N 21/812* (2013.01); *G06Q 30/0241* (2013.01); *H04N 21/23418* (2013.01); *H04N 21/25435* (2013.01); *H04N 21/6118* (2013.01)

(58) Field of Classification Search
None
See application file for complete search history.

(56) References Cited

U.S. PATENT DOCUMENTS 5,481,294 A 1/1996 Thomas et al.
5,504,518 A 4/1996 Ellis et al.
(Continued)

OTHER PUBLICATIONS

United States Patent and Trademark Office, "Notice of Allowance," mailed in connection with U.S. Appl. No. 15/334,875, dated Dec. 12, 2018, 7 pages.

(Continued)

*Primary Examiner* — William J Kim

(57) ABSTRACT

Methods, apparatus, systems and articles of manufacture (e.g., physical storage media) to credit commercial broadcasts are disclosed. Example commercial crediting apparatus disclosed herein compare first identification information and first timing information obtained from a first monitored data feed with second identification information and second timing information in a second monitored data feed to identify a first final distributor code represented in the second monitoring data feed, the first identification information and the first timing information corresponding to a first commercial represented in the first monitored data feed. Disclosed example apparatus also access data that maps a first original distributor code to the first final distributor code, identify the first commercial in lineup data based on the first original distributor code, and adjust, based on a duration of the first commercial, a duration obtained for a first media program listed in the lineup data.

20 Claims, 8 Drawing Sheets

Related U.S. Application Data continuation of application No. 16/791,909, filed on Feb. 14, 2020, now Pat. No. 11,089,385, which is a continuation of application No. 16/390,607, filed on Apr. 22, 2019, now Pat. No. 10,567,848, which is a continuation of application No. 15/334,875, filed on Oct. 26, 2016, now Pat. No. 10,271,107.

(51) Int. Cl.
  *H04N 21/234* (2011.01)
  *H04N 21/61* (2011.01)
  *H04N 21/81* (2011.01)

(56) References Cited

U.S. PATENT DOCUMENTS

| | | | |
|---|---|---|---|
| 5,526,427 | A | 6/1996 | Thomas et al. |
| 6,289,514 | B1 | 9/2001 | Link et al. |
| 6,530,082 | B1 | 3/2003 | Del Sesto et al. |
| 6,845,213 | B2 | 1/2005 | Maas et al. |
| 7,716,698 | B2 | 5/2010 | Whymark |
| 7,742,737 | B2 | 6/2010 | Peiffer et al. |
| 8,065,696 | B2 | 11/2011 | Scott, III et al. |
| 8,065,697 | B2 | 11/2011 | Wright et al. |
| 8,359,205 | B2 | 1/2013 | Srinivasan et al. |
| 8,578,404 | B2 | 11/2013 | McMillan |
| 8,666,528 | B2 | 3/2014 | Harkness et al. |
| 8,874,924 | B2 | 10/2014 | McMillan |
| 8,881,216 | B2 | 11/2014 | Putnam et al. |
| 9,368,123 | B2 | 6/2016 | Srinivasan et al. |
| 10,271,107 | B2 | 4/2019 | Goli et al. |
| 10,567,848 | B2 | 2/2020 | Goli et al. |
| 11,089,385 | B2 | 8/2021 | Goli et al. |
| 11,496,813 | B2 | 11/2022 | Goli et al. |
| 2003/0131350 | A1 | 7/2003 | Peiffer et al. |
| 2004/0015400 | A1 | 1/2004 | Whymark |
| 2004/0133909 | A1 | 7/2004 | Ma |
| 2006/0041902 | A1 | 2/2006 | Zigmond |
| 2006/0195863 | A1 | 8/2006 | Whymark |
| 2007/0039018 | A1 | 2/2007 | Saslow et al. |
| 2007/0050832 | A1 | 3/2007 | Wright et al. |
| 2007/0136782 | A1 | 6/2007 | Ramaswamy et al. |
| 2008/0059884 | A1 | 3/2008 | Ellis et al. |
| 2010/0106510 | A1 | 4/2010 | Topchy et al. |
| 2010/0115543 | A1 | 5/2010 | Falcon |
| 2013/0007790 | A1 | 1/2013 | McMillan |
| 2013/0064524 | A1 | 3/2013 | Griffin et al. |
| 2014/0105448 | A1 | 4/2014 | Srinivasan et al. |
| 2014/0129841 | A1 | 5/2014 | Mcmillan |
| 2014/0267931 | A1 | 9/2014 | Gilson et al. |
| 2016/0080789 | A1 | 3/2016 | Muller et al. |
| 2017/0155972 | A1 | 6/2017 | Goli et al. |
| 2019/0253769 | A1 | 8/2019 | Goli et al. |

OTHER PUBLICATIONS

United States Patent and Trademark Office, "Final Office Action," mailed in connection with U.S. Appl. No. 15/334,875, dated Jul. 30, 2018, 9 pages.

United States Patent and Trademark Office, "Non-final Office Action, " mailed in connection with U.S. Appl. No. 15/334,875, dated Mar. 1, 2018, 8 pages.

United States Patent and Trademark Office, "Non-final Office Action," mailed in connection with U.S. Appl. No. 15/334,875, dated Aug. 17, 2017, 19 pages.

United States Patent and Trademark Office, "Notice of Allowance," mailed in connection with U.S. Appl. No. 16/390,607, dated Sep. 25, 2019, 8 pages.

United States Patent and Trademark Office, "Notice of Allowance," mailed in connection with U.S. Appl. No. 16/791,909, dated Apr. 26, 2021, 2 pages.

United States Patent and Trademark Office, "Notice of Allowance," mailed in connection with U.S. Appl. No. 16/791,909, dated Apr. 7, 2021, 7 pages.

United States Patent and Trademark Office, "Non-Final Rejection," mailed in connection with U.S. Appl. No. 16/791,909, dated Dec. 22, 2020, 10 pages.

United States Patent and Trademark Office, "Non-Final Rejection," mailed in connection with U.S. Appl. No. 17/397,595 dated Mar. 15, 2022, 10 pages.

United States Patent and Trademark Office, "Notice of Allowance and Fee(s) Due," mailed in connection with U.S. Appl. No. 17/397,595 dated Jun. 30, 2022, 8 pages.

200

| Column name | Description |
|---|---|
| BROADCAST_DATE (205) | Date in YYYY-MM-DD format. Follows day definition 6am-6am Eastern time |
| STATION (210) | Station code |
| AIR TIME (220) | Commerical air time |
| COMMID (215) | Commerical id |
| DUR (225) | Commerical duration |
| TYPE (230) | Commerical type ( C - commerical, P - Promo, O- PSA) |
| CLASS (235) | Commerical class<br>L-local, N-network, B-barter, H-moving sponsorship, G-negotiated spot, I-institutional, M-multi-barter |
| END TIME (240) | Commercial end time |
| TOWER ID (245) | Tower id |
| ORIGINATOR_TYPE_CODE (250) | 8 - Broadcast<br>9 – Cable<br>12 – Syndication<br>21 – Unwired |

FIG. 2

ACCELERATED TELEVISION ADVERTISEMENT IDENTIFICATION

CROSS-REFERENCE TO RELATED APPLICATIONS

This patent arises from a continuation of U.S. patent application Ser. No. 17/397,595 (now U.S. Pat. No. 11,496, 813), which is titled "ACCELERATED TELEVISION ADVERTISEMENT IDENTIFICATION," and which was filed on Aug. 9, 2021, which is a continuation of U.S. patent application Ser. No. 16/791,909 (now U.S. Pat. No. 11,089, 385), which is titled "ACCELERATED TELEVISION ADVERTISEMENT IDENTIFICATION," and which was filed on Feb. 14, 2020, which is a continuation of U.S. patent application Ser. No. 16/390,607 (now U.S. Pat. No. 10,567, 848), which is titled "ACCELERATED TELEVISION ADVERTISEMENT IDENTIFICATION," and which was filed on Apr. 22, 2019, which is a continuation of U.S. patent application Ser. No. 15/334,875 (now U.S. Pat. No. 10,271, 107), which is titled "ACCELERATED TELEVISION ADVERTISEMENT IDENTIFICATION," and which was filed on Oct. 26, 2016. Priority to U.S. patent application Ser. No. 17/397,595, U.S. patent application Ser. No. 16/791, 909, U.S. patent application Ser. No. 16/390,607 and U.S. patent application Ser. No. 15/334,875 is hereby claimed. U.S. patent application Ser. No. 17/397,595, U.S. patent application Ser. No. 16/791,909, U.S. patent application Ser. No. 16/390,607 and U.S. patent application Ser. No. 15/334, 875 are hereby incorporated by reference in their respective entireties.

FIELD OF THE DISCLOSURE

This disclosure relates generally to media monitoring and, more particularly, to accelerated television advertisement identification.

BACKGROUND

Commercial monitoring systems are implemented by audience measurement entities to monitor media distribution feeds for the presence of commercials. Some commercial monitoring systems detect the presence of commercials by detecting codes, such as watermark data, embedded in or otherwise included in the media distribution feeds. The detected codes/watermarks can be used to cross-reference lineup data, which is provided by distributors (e.g., networks, such as cable networks, television broadcast networks, etc.) partnering with the audience measurement entities, to identify the detected commercials and retrieve attribute data included in the lineup data for the detected commercials.

BRIEF DESCRIPTION OF THE DRAWINGS

FIG. 2 is a table listing example commercial crediting feed data output from an example commercial monitoring system included in the example systems of FIGS. 1 and 3.

The figures are not to scale. Wherever possible, the same reference numbers will be used throughout the drawing(s) and accompanying written description to refer to the same or like parts, elements, etc.

DETAILED DESCRIPTION

Figure 1:
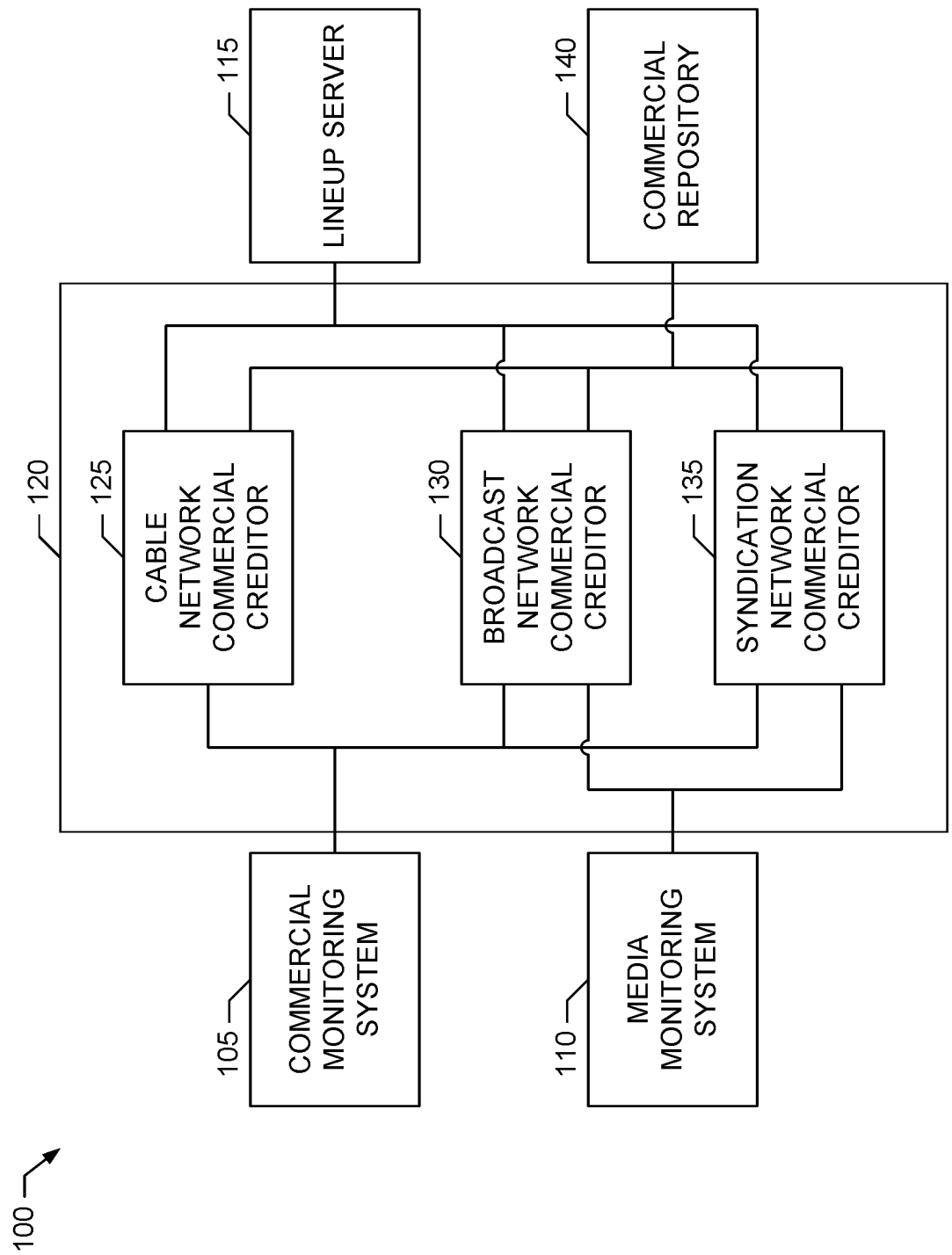
FIG. 1 is a block diagram of an example commercial crediting system implemented in accordance with the teachings of this disclosure.

Methods, apparatus, systems and articles of manufacture (e.g., physical storage media) to credit commercial broadcasts are disclosed. Example commercial crediting methods disclosed herein include accessing commercial crediting feed data corresponding to a first monitored commercial. Disclosed example method also include, in response to determining the first monitored commercial was distributed via a cable network, comparing the commercial crediting feed data to lineup data to identify crediting data for the first monitored commercial. Disclosed example methods further include, in response to determining the first monitored commercial was distributed via a broadcast network, comparing the commercial crediting feed data to media monitoring system data to identify a code included in a network feed to identify the first monitored commercial, and comparing the code to the lineup data to identify the crediting data for the first monitored commercial. Disclosed example methods additionally include storing the crediting data for the first monitored commercial in a data repository.

These and other example methods, apparatus, systems and articles of manufacture (e.g., physical storage media) to credit commercial broadcasts are disclosed in further detail below.

As noted above, commercial monitoring systems are implemented by audience measurement entities to monitor media distribution feeds for the presence of commercials. Some commercial monitoring systems detect the presence of commercials by detecting codes, such as watermark data, embedded in or otherwise included in the media distribution feeds. The detected codes/watermarks can be used to cross-reference lineup data, which is provided by distributors (e.g., networks, such as cable networks, television broadcast networks, etc.) partnering with the audience measurement entities, to identify the detected commercials and retrieve attribute data included in the lineup data for the detected commercials.

In some commercial monitoring systems, the code/watermarks detected in the media distribution feeds are final distributor codes, and the lineup data is provided by the distributors of the media (e.g., program content and commercials) included in the media distribution feeds. In the case of monitoring media distribution feeds corresponding to cable network feeds, the final distributor of the media distribution feed is also the original distributor, namely, the cable network. In such cases, the code/watermarks detected and included in the commercial crediting feeds provided by the commercial monitoring systems correspond to the original distributor's (e.g., the cable network's) lineup data. Thus, commercial crediting feed data can be used to directly cross-reference the original distributor's lineup data to determine the commercial crediting data (e.g., identity and attribute data) for the monitored commercials in such cases.

However, in the case of monitoring media distribution feeds corresponding to television broadcast network feeds, the original distributor and the final distributor may not be the same. For example, the original distributor of the media (e.g., program content and commercials) may be a broadcast network (e.g., ABC, NBC, CBS, etc.), whereas the final distributor may be a local affiliate station. In such cases, the final distributor code/watermarks detected and included in a commercial crediting feeds provided by a commercial monitoring systems may be local distributor codes added by a local affiliate station. Such commercial crediting feed data may be able to cross-reference lineup data provided by the local affiliate station, but may be unable to cross-reference the original distributor's (e.g., the broadcast network's) lineup data. Thus, commercial crediting feeds provided by existing commercial monitoring systems may be unable to directly credit commercials distributed by a broadcast network (e.g., at a national level). To enable crediting of commercials distributed by a broadcast network, existing commercial monitoring systems may rely on a back-end auditing procedure, which involves human personnel examining the commercial attribute data included in the commercial crediting feed data to identify the matching commercial(s) in the original distributor's (e.g., the broadcast network's) lineup data. Such a back-end auditing procedure may be time consuming, thereby delaying when the crediting results for commercials distributed by the broadcast network can be reported to customers. Similar technical problems are exhibited by commercial crediting feeds associated with syndication network broadcasts because the original and final media distributors may be different.

Example commercial crediting systems disclosed herein provide technical solutions to such technical problems associated with performing accurate, and timely, crediting of commercials included in media distribution feeds across many different types of distribution networks. For example, commercial crediting systems disclosed herein utilize the commercial crediting feeds provided by an existing commercial monitoring system to cross-reference lineup data provided by a cable network to credit commercials included in a monitored cable network distribution feed. However, unlike prior systems, disclosed example commercial crediting systems employ automated procedures to compare commercial crediting feeds provided by the existing commercial monitoring system to media monitoring system data provided by a separate media monitoring system to credit commercials included in media distribution feeds, such as broadcast television feeds, in which the original and final media distributors may be different. For example, and as disclosed in further detail below, commercial crediting systems disclosed herein can compare commercial crediting feeds to media monitoring system data associated with a same monitored media distribution feed to identify a code included in another media distribution feed (e.g., a network distribution feed) used by the original distributor (e.g., broadcast network) to provide the media to the final distributor (e.g., a local affiliate station) for distribution. This code is then compared to lineup data provided by the original distributor to determine crediting data for commercials detected in the monitored media distribution feed.

Turning to the figures, a block diagram of an example commercial crediting system 100 implemented in accordance with the teachings of this disclosure is illustrated in FIG. 1. The example commercial crediting system 100 includes one or more example commercial monitoring systems 105, which may be implemented by a conventional commercial monitoring system. For example, the commercial monitoring system 105 of the illustrated example may correspond to the Nielsen Monitor Plus™ system and/or any other commercial monitoring system.

In the illustrated example, the commercial crediting system 100 monitors media distribution feeds, such as one or more cable network distribution feeds, television broadcast distribution feeds, etc., to detect commercials included in the feeds. The example commercial crediting system 100 outputs a commercial crediting feed, which includes crediting data for the monitored commercials. Example commercial crediting data 200 included in the commercial crediting feed output by the commercial crediting system 100 is illustrated in the example table of FIG. 2.

Turning to FIG. 2, the example commercial crediting data 200 included in the commercial crediting feed for a given commercial includes an example BROADCAST_DATE data field 205 specifying a broadcast date of the given commercial. The example commercial crediting data 200 for the given commercial includes an example STATION data field 210 specifying a station code corresponding to the distribution feed in which the given commercial was detected. The example commercial crediting data 200 for the given commercial includes an example COMMID data field 215 specifying a commercial identifier assigned to the given commercial. The example commercial crediting data 200 for the given commercial includes an example AIR TIME data field 220 specifying a time interval during which the commercial was aired (e.g., broadcast), and an example DUR data field 225 specifying the duration of the complete commercial. In general, the AIR TIME data field 220 and the DUR data field 225 for a given commercial should have substantially similar durations unless, for example, broadcast of the given commercial was truncated, in which the duration of the AIR TIME data field 220 would be less than the value of the DUR data field 225.

The example commercial crediting data 200 for the given commercial includes an example TYPE data field 230 specifying a type of the commercial and an example CLASS data field 235 specifying a class of the commercial. For example, these data fields can specify whether the commercial is local or national, and/or whether the commercial is a typical paid commercial, a promotion (e.g., associated with the station broadcasting the commercial), a public service announcement (PSA), etc. The example commercial crediting data 200 for the given commercial includes an example END TIME data field 240 specifying an end time of the commercial. The example commercial crediting data 200 for the given commercial includes an example TOWER ID data field 245 identifying, for example, the broadcast tower of the television broadcaster used to broadcast the commercial. The example commercial crediting data 200 for the given commercial includes an example ORIGINATOR_TYPE_CODE data field 250 to specify the type of final distributor for the given commercial. For example, and as disclosed in further detail below, the ORIGINATOR_TYPE_CODE data field 250 can be used to determine whether the commercial was detected in a distribution feed corresponding to a broadcast network, a cable network, a program syndicator, etc.

Returning to FIG. 1, the example commercial crediting system 100 illustrated therein also includes one or more example media monitoring systems (MMSs) 110 to monitor media included in the media distribution feeds. The media distribution feeds undergoing monitoring may include, but are not limited to, final distributor feeds, such as cable network feeds, local television station feeds, etc., providing media (e.g., program content, commercials, etc.) to media devices. The MMS 110 of the illustrated example also monitors media distribution feeds used by original distributors (e.g., television networks) to provide media (e.g., program content, commercials, etc.) to final distributors for distribution to media devices. For example, such media distribution feeds may correspond to national satellite feeds used by broadcast networks to transmit media (e.g., program content, commercials, etc.) to local affiliate stations for broadcast in their local feeds to receiving media devices. As used herein, the term "media" includes any type of content and/or commercial (e.g., advertisement) delivered via any type of distribution medium. Thus, media includes television programming or commercials (e.g., advertisements), radio programming or advertisements, movies, web sites, streaming media, etc.

In the illustrated example, the MMS 110, among other things, detects codes/watermarks identifying the media (e.g., program content, commercials, etc.) included in the monitored media distribution feeds. In some examples, the MMS 110 also generates signatures representative of the media (e.g., program content, commercials, etc.) included in the monitored media distribution feeds. For example, media watermarking is a technique used to identify media, such as television broadcasts, radio broadcasts, advertisements (television and/or radio), downloaded media, streaming media, prepackaged media, etc. Existing media watermarking techniques identify media by embedding one or more codes (e.g., one or more watermarks), such as media identifying information and/or an identifier that may be mapped to media identifying information, into an audio and/or video component of the media distribution feed. In some examples, the audio or video component is selected to have a signal characteristic sufficient to hide the watermark. As used herein, the terms "code" and "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In the illustrated example of FIG. 1, for the final distributor media distribution feeds being monitored, the MMS 110 detects final distributor codes/watermarks for the monitored media, and determines time information (e.g., such as start and end times) indicating when the media was distributed (e.g., aired) for receipt by media devices. For the original distributor media distribution feeds being monitored, the MMS 110 detects original distributor codes/watermarks for the monitored media, and detects encoding start and end times (and any intermediate times) encoded in the media distribution feeds by the original distributors. For example, the encoding start and end times can represent a time-in-content (TIC) indicating the duration of the encoded media, and marking elapsed time(s) within the encoded media. The MMS 110 further maintains a mapping between the final distributor codes and original distributor codes for the different monitored media. For example, the final distributor codes/watermarks may be added in a hierarchical manner to the original distributor codes/watermarks already included with the media when the final distributor prepares the final distributor media distribution feeds for broadcast. In such examples, the MMS 110 can detect both the final distributor and original distributor codes/watermarks included in the final distributor media distribution feeds to determine the mapping between final distributor codes and original distributor codes.

The example commercial crediting system 100 of FIG. 1 further includes an example lineup server 115 to store and allow access to media (e.g., program and/or commercial) lineup data provided by distributors (e.g., original and/or final) partnering with the audience measurement entity operating the system 100. In some examples, the lineup data stored in the lineup server 115 includes, but is not limited to, data that maps distributor codes/watermarks to media identification information, as well as one or more attributes associated with the media. For example, the attributes may include, but are not limited to, one or more of the example media attributes illustrated in the example table of FIG. 2.

To perform commercial crediting in accordance with the teachings of this disclosure, the example commercial crediting system 100 includes an example commercial creditor 120. The example commercial creditor 120 of FIG. 1 further includes an example cable network commercial creditor 125, an example broadcast network commercial creditor 130 and an example syndication network commercial creditor 135. The example cable network commercial creditor 125 implements crediting of commercials detected in cable network distribution feeds. In the illustrated example, the cable network commercial creditor 125 accesses commercial crediting feed data provided by the example commercial monitoring system 105 for a monitored commercial identified in the commercial crediting feed data. Then, in response to determining the monitored commercial was distributed via a cable network (e.g., based on the ORIGINATOR_TYPE_CODE included in the commercial crediting feed data), the cable network commercial creditor 125 compares the commercial crediting feed data for the monitored commercial to lineup data stored in the example lineup server 115 to identify crediting data for the first monitored commercial. In some examples, the cable network commercial creditor 125 uses the STATION code included in the accessed commercial crediting feed data to identify particular lineup data for the cable network associated with the media distribution feed including the monitored commercial. Then, because the cable network was the original distributor, the cable network commercial creditor 125 can directly use the commercial identifier (COMMID) and time information (e.g., BROADCAST_DATE and AIR TIME data) included in the commercial crediting feed data to identify the monitored commercial and associated attribute data from the particular lineup data for that cable network.

The example broadcast network commercial creditor 130 implements crediting of commercials detected in broadcast network distribution feeds. In the illustrated example, the broadcast network commercial creditor 130 accesses commercial crediting feed data provided by the example commercial monitoring system 105 for a monitored commercial identified in the commercial crediting feed data. Then, in response to determining the monitored commercial was distributed via a broadcast network (e.g., based on the ORIGINATOR_TYPE_CODE included in the commercial crediting feed data) and not a cable network, the broadcast network commercial creditor 130 accesses media monitoring system data provided by the example MMS 110. Because the commercial crediting feed data is based on detected codes/watermarks associated with a final distributor (e.g., a local affiliate station), which may be different from the original distributor (e.g., a television broadcast network), the broadcast network commercial creditor 130 uses MMS data provided by the MMS 110 to identify a original distributor code/watermark (and possibly other attributes) for the monitored commercial, which can then be compared to the lineup data stored in the example lineup server 115 to identify crediting data for the first monitored commercial.

Figure 4:
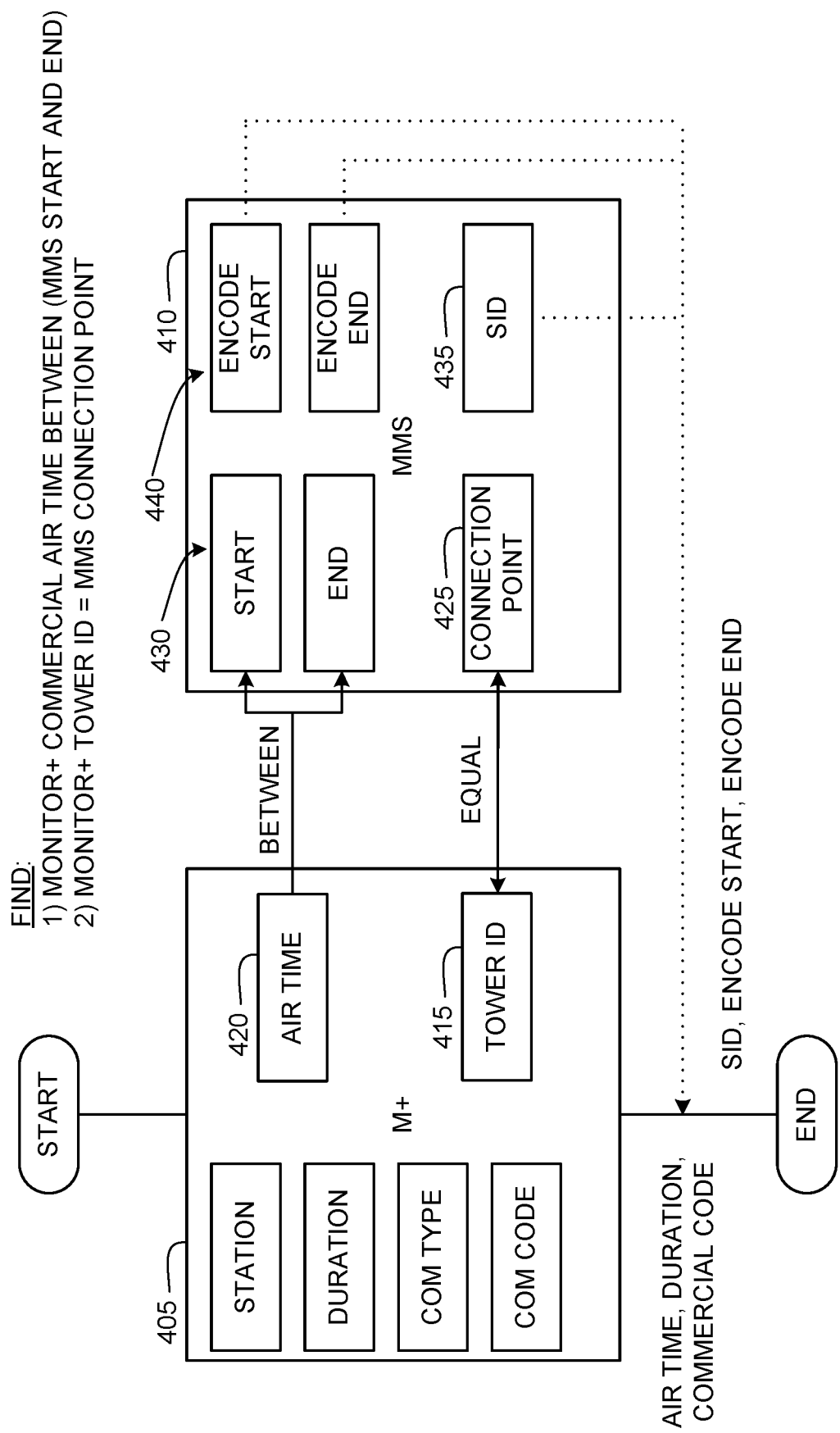
FIG. 4 illustrates example operation of an example broadcast network commercial creditor included in the example systems of FIGS. 1 and 3.

In some examples, the broadcast network commercial creditor 130 compares distribution feed identification information (e.g., such as the TOWER ID data) and time information (e.g., BROADCAST_DATE and AIR TIME data) included to commercial crediting feed data for the monitored commercial with final distributor distribution feed identification information (e.g., such as connection point data) and time information (e.g., broadcast start and end times) included in the MMS data to identify the corresponding final distributor code/watermark in the MMS data for the monitored commercial. The broadcast network commercial creditor 130 then uses the mappings of final distributor codes/watermarks to original distributor codes/watermarks included in the MMS data to identify the original distributor code/watermark detected by the MMS 110 from the original distributor media distribution feed (e.g., the network feed) used by the original distributor to provide the monitored commercial to the final distributor. The broadcast network commercial creditor 130 uses this original distributor code/watermark to identify particular lineup data from the lineup server 115 for the original distributor. Then, the broadcast network commercial creditor 130 can use the original distributor code/watermark, as well as original distributor time information (e.g., encoding start and end times) from the mapped MMS data, to identify the monitored commercial and associated attribute data from the particular lineup data for that original distributor (e.g., the originating television broadcast network). Further example operation of the broadcast network commercial creditor 130 is illustrated in FIG. 4, which is described in further detail below.

Figure 5:
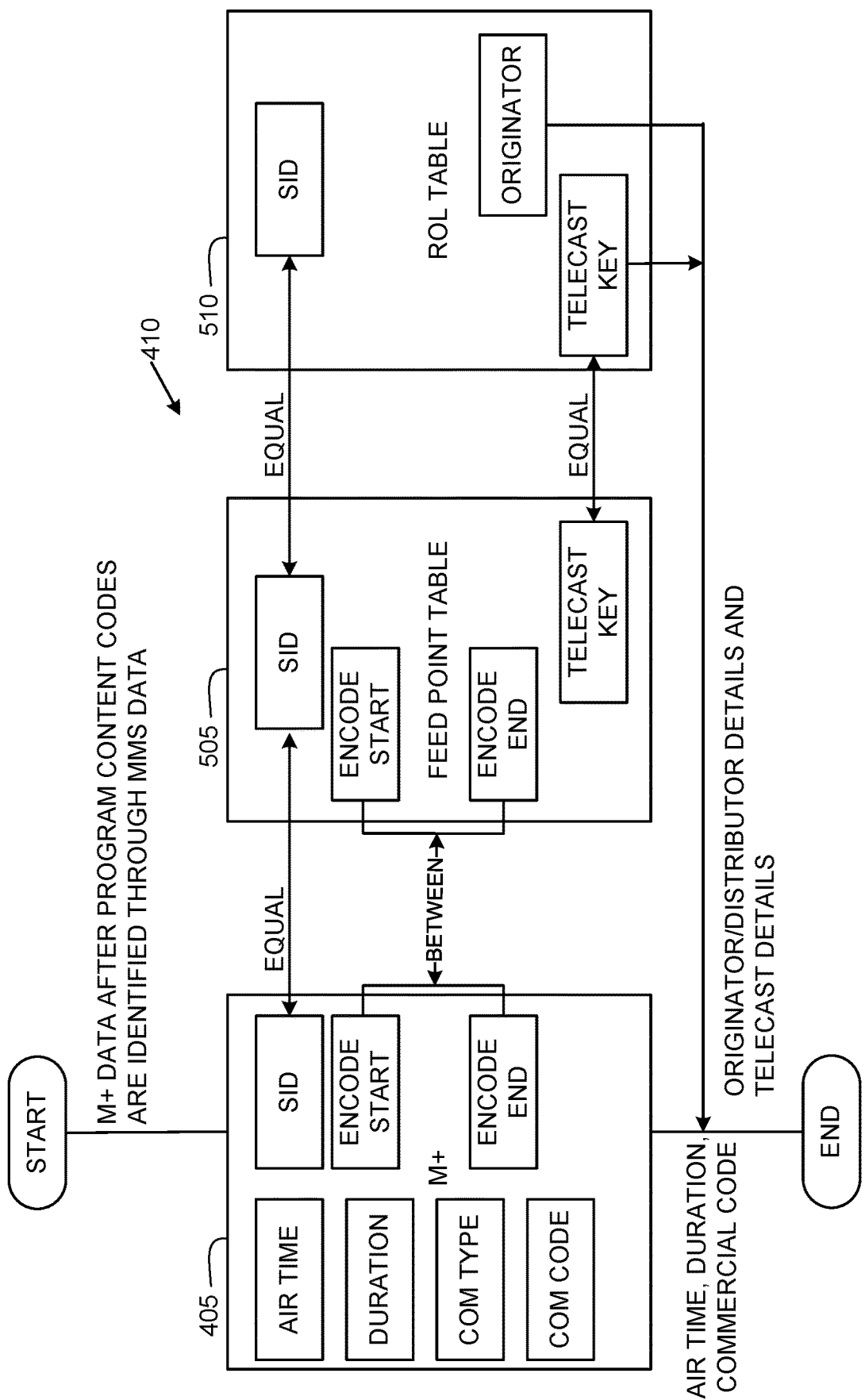
FIG. 5 illustrates example operation of an example syndication network commercial creditor included in the example systems of FIGS. 1 and 3.

The example syndication network commercial creditor 135 implements crediting of commercials detected in syndication network distribution feeds. In the illustrated example, the syndication network commercial creditor 135 operates in a manner similar to the example broadcast network commercial creditor 130, but with an additional telecast mapping operation. Further example operation of the syndication network commercial creditor 135 is illustrated in FIG. 5, which is described in further detail below.

The example commercial crediting system 100 of FIG. 1 includes an example commercial repository 140 to store and report crediting data for commercials monitored by the example commercial creditor 120. To store the commercial crediting data, the example commercial repository 140 may include any number(s) and/or type(s) of volatile and/or non-volatile memory, storage, etc., or combination(s) thereof, such as the example volatile memory 814 and/or the example mass storage device(s) 828 included in the example processing system 800 of FIG. 8, which is described in further detail below. To report the commercial crediting data to one or more computing devices via one or more computing networks, such as the Internet, the example commercial repository 140 may include one or more network interfaces implemented by one or more interface circuits, such as the example interface circuit 820 included in the example processing system 800 of FIG. 8, which is described in further detail below.

Figure 3:
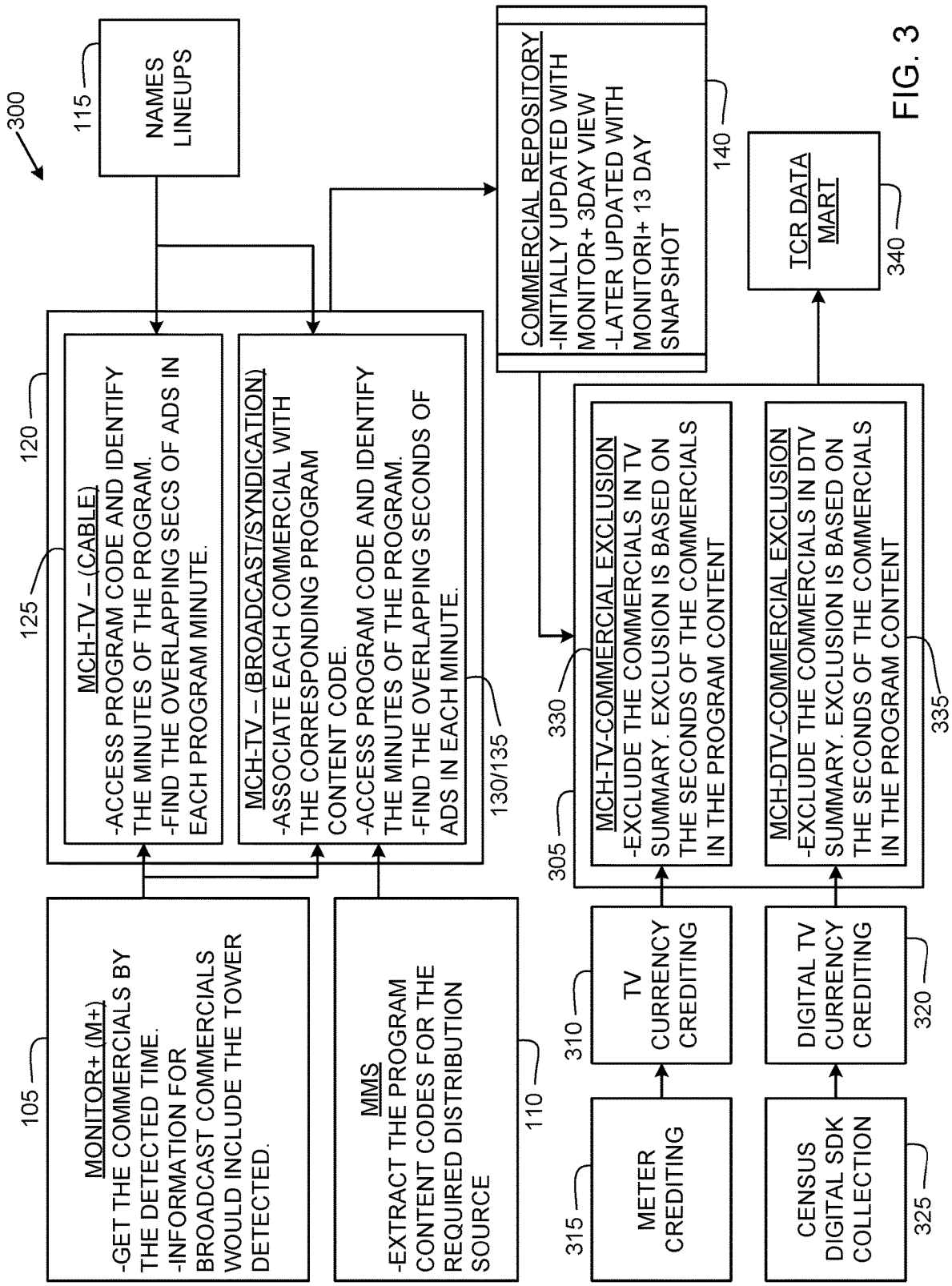
FIG. 3 is a block diagram of an example total content ratings system implemented in accordance with the teachings of this disclosure.

In some examples, the example commercial crediting system 100 can be included in a total content ratings system to identify commercials accompanying program content, and to allow the identified commercials to be excluded from the ratings data determined for the program content. An example total content ratings system 300 implemented in accordance with the teachings of this disclosure is illustrated in FIG. 3. The total content ratings system 300 includes many elements in common with the example commercial crediting system 100 of FIG. 1. As such, like elements in FIGS. 1 and 3 are labeled with the same reference numerals.

The example total content ratings system 300 of FIG. 3 provides combined audience measurement data for media content (e.g., video program content) exposure across multiple delivery platforms. For example, total content ratings (TCR) provide combined exposure metrics across television, computer (e.g., online) and mobile platforms. In some examples, total content ratings include minute level live ratings and/or live to 7 day (live+7) ratings, which are collected and combined from various sources capable of monitoring multiple types of media distribution platforms and receiving media devices, such as active/passive (AP) television monitoring systems, national people metering (NPM) and/or local people metering (LPM) systems, digital media metering systems (e.g., such as systems that monitor content management systems and/or ID3 tags accompanying distributed media), big data, etc.

In some examples, total content ratings are intended to focus on media program content and to exclude commercials and other advertisements. This is because the media program content to be monitored may be similar across the multiple different distribution platforms, but the delivery of commercials/advertisements may differ (e.g., such as by being provided interspersed with the program content in a television distribution context, but being provided in a separate pop-up window, sidebar, etc., in an online distribution context). Thus, the example total content ratings system 300 identifies the commercials/advertisements accompanying monitored media program content and excludes the identified commercials/advertisements from the total content ratings determined for the monitored media program content, thereby yielding more accurate, program-only exposure metrics.

To identify the commercials/advertisements accompanying monitored media program content, the example total content ratings system 300 of FIG. 3 includes aspects of the example commercial crediting system 100 of FIG. 1. For example, the total content ratings system 300 of FIG. 3 includes the example commercial monitoring system 105, the example MMS 110, the example lineup server 115, the example commercial creditor 120, the example cable network commercial creditor 125, the example broadcast network commercial creditor 130, the example syndication network commercial creditor 135 and the example commercial repository 140 of FIG. 1. In the illustrated example of FIG. 3, the example cable network commercial creditor 125, the example broadcast network commercial creditor 130 and the example syndication network commercial creditor 135 are augmented to further process the lineup data to identify program content adjacent (e.g., distributed before and/or after) a monitored commercial being identified. In some examples, the cable network commercial creditor 125, the broadcast network commercial creditor 130 and the syndication network commercial creditor 135 are also augmented to obtain duration and/or other timing information for such adjacent program content to, for example, permit the duration of the program content to be adjusted by excluding presentation of the commercial from the overall broadcast time associated with the program content.

For example, the total content ratings system 300 of FIG. 3 includes an example commercial excluder 305 to exclude commercials from total content ratings determined for the monitored media program content (e.g., television program episode, movie, etc.). In the illustrated example, the commercial excluder 305 accesses example television currency crediting data 310 provided by, for example, one or more example AP television metering systems 315 monitoring television media distribution (e.g., cable, broadcast network, etc.). The example commercial excluder 305 also accesses example digital television currency crediting data 320 provided by, for example, one or more example census digital software development kit (SDK) collection systems 325 monitoring digital media distribution (e.g., mobile, online, etc.). The example commercial excluder 305 includes an example television commercial excluder 330 to exclude monitored commercials from the total content ratings for monitored program content represented in the television currency crediting data 310 by, for example, subtracting the duration (e.g., in seconds) listed in the crediting data stored in the commercial repository 140 for the monitored commercial from the duration (e.g., in seconds, minutes, etc.) listed in the television currency crediting data 310 for the monitored program content. The example commercial excluder 305 includes an example digital television commercial excluder 335 to exclude monitored commercials from the total content ratings for monitored program content represented in the digital television currency crediting data 320 by, for example, subtracting the duration (e.g., in seconds) listed in the crediting data stored in the commercial repository 140 for the monitored commercial from the duration (e.g., in seconds, minutes, etc.) listed in the digital television currency crediting data 320 for the monitored program content.

The example total content ratings system 300 of FIG. 3 includes an example total content ratings data mart 340 to store and report total content ratings for monitored media content. To store the total content ratings, the example total content ratings data mart 340 may include any number(s) and/or type(s) of volatile and/or non-volatile memory, storage, etc., or combination(s) thereof, such as the example volatile memory 814 and/or the example mass storage device(s) 828 included in the example processing system 800 of FIG. 8, which is described in further detail below. To report the total content ratings to one or more computing devices via one or more computing networks, such as the Internet, the example total content ratings data mart 340 may include one or more network interfaces implemented by one or more interface circuits, such as the example interface circuit 820 included in the example processing system 800 of FIG. 8, which is described in further detail below.

Example operation of the example broadcast network commercial creditor 130 of FIGS. 1 and 3 is illustrated in FIG. 4. In the illustrated example of FIG. 4, the broadcast network commercial creditor 130 accesses example commercial crediting feed data 405 provided by the example commercial monitoring system 105 for a monitored commercial identified in the commercial crediting feed data. Then, in response to determining the monitored commercial was distributed via a broadcast network (e.g., based on an ORIGINATOR_TYPE_CODE, as described above), the broadcast network commercial creditor 130 accesses example media monitoring system data 410 provided by the example MMS 110. The broadcast network commercial creditor 130 compares distribution feed identification information (e.g., such as the example TOWER ID data 415) and time information (e.g., example AIR TIME data 420) included to commercial crediting feed data 405 for the monitored commercial with final distributor (e.g., local affiliate station) distribution feed identification information (e.g., such as example connection point data 425) and time information (e.g., example broadcast start and end times 430) included in the MMS data 410 to identify an example corresponding final distributor code/watermark in the MMS data 410 for the monitored commercial. The broadcast network commercial creditor 130 then uses the mappings of final distributor codes/watermarks to original distributor codes/watermarks included in the MMS data 410 to identify the original distributor code/watermark (e.g., an example source identifier 435) detected by the MMS 110 from the original distributor media distribution feed (e.g., the network feed) used by the original distributor to provide the monitored commercial to the final distributor. The broadcast network commercial creditor 130 uses this original distributor code/watermark to identify particular lineup data from the lineup server 115 for the original distributor. Then, the broadcast network commercial creditor 130 can use the original distributor code/watermark 435, as well as original distributor time information (e.g., example encoding start and end times 440) from the mapped MMS data, to identify the monitored commercial and associated attribute data from the particular lineup data for that original distributor (e.g., the originating television broadcast network).

Example operation of an example syndication network commercial creditor 135 of FIGS. 1 and 3 is illustrated in FIG. 5. Operation of the example syndication network commercial creditor 135 as depicted in FIG. 5 is similar to operation of the example broadcast network commercial creditor 130 as depicted in FIG. 4. However, in the illustrated example of FIG. 5, the MMS data 410 includes an example feed point table 505 and an example reportable origination lineup (ROL) table 510 to further map monitored commercials to particular telecasts of syndicated media (e.g., via example TELECAST KEYS 515 and 520). The reportable origination lineup table 510 also enables the syndication network commercial creditor 135 to identify a particular syndication originator 525 associated with the monitored media.

While example manners of implementing the example commercial crediting system 100 and the example total content ratings system 300 are illustrated in FIGS. 1-5, one or more of the elements, processes and/or devices illustrated in FIGS. 1-5 may be combined, divided, re-arranged, omitted, eliminated and/or implemented in any other way. Further, the example commercial monitoring system 105, the example MMS 110, the example lineup server 115, the example commercial creditor 120, the example cable network commercial creditor 125, the example broadcast network commercial creditor 130, the example syndication network commercial creditor 135 and the example commercial repository 140, the example commercial excluder 305, the example AP television metering system(s) 315, the example digital SDK collection systems 325, the example television commercial excluder 330, the example digital television commercial excluder 335, the example total content ratings data mart 340 and/or, more generally, the example commercial crediting system 100 and the example total content ratings system 300 of FIGS. 1-5 may be implemented by hardware, software, firmware and/or any combination of hardware, software and/or firmware. Thus, for example, any of the example commercial monitoring system 105, the example MMS 110, the example lineup server 115, the example commercial creditor 120, the example cable network commercial creditor 125, the example broadcast network commercial creditor 130, the example syndication network commercial creditor 135 and the example commercial repository 140, the example commercial excluder 305, the example AP television metering system(s) 315, the example digital SDK collection systems 325, the example television commercial excluder 330, the example digital television commercial excluder 335, the example total content ratings data mart 340 and/or, more generally, the example commercial crediting system 100 and the example total content ratings system 300 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example commercial crediting system 100, the example total content ratings system 300, the example commercial monitoring system 105, the example MMS 110, the example lineup server 115, the example commercial creditor 120, the example cable network commercial creditor 125, the example broadcast network commercial creditor 130, the example syndication network commercial creditor 135 and the example commercial repository 140, the example commercial excluder 305, the example AP television metering system(s) 315, the example digital SDK collection systems 325, the example television commercial excluder 330, the example digital television commercial excluder 335 and/or the example total content ratings data mart 340 is/are hereby expressly defined to include a tangible computer readable storage device or storage disk such as a memory, a digital versatile disk (DVD), a compact disk (CD), a Blu-ray disk, etc. storing the software and/or firmware. Further still, the example commercial crediting system 100 and/or the example total content ratings system 300 may include one or more elements, processes and/or devices in addition to, or instead of, those illustrated in FIGS. 1-5, and/or may include more than one of any or all of the illustrated elements, processes and devices.

Figure 6:
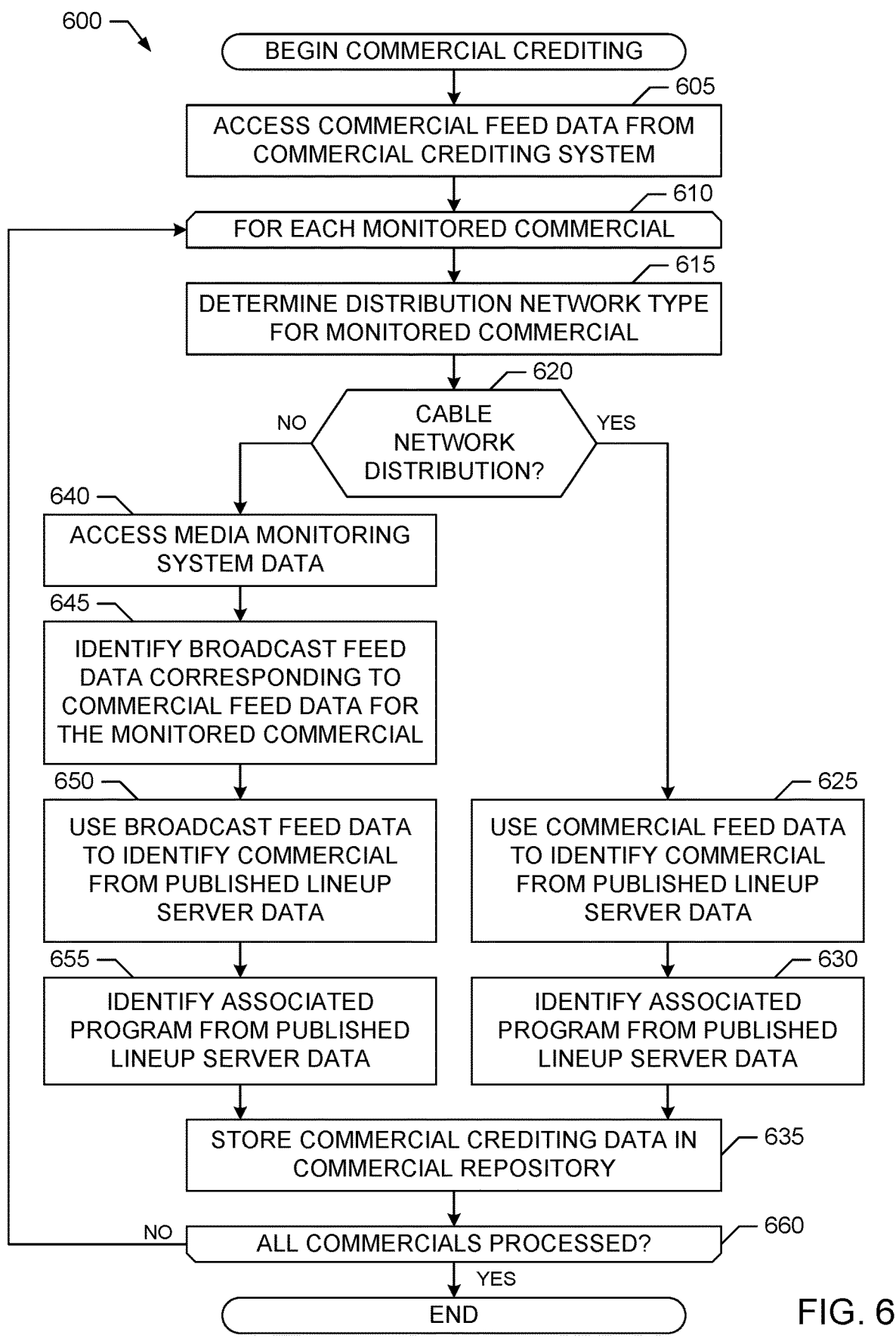
FIG. 6 is a flowchart representative of example machine readable instructions that may be executed to implement the example commercial crediting system of FIG. 1.
Figure 7:
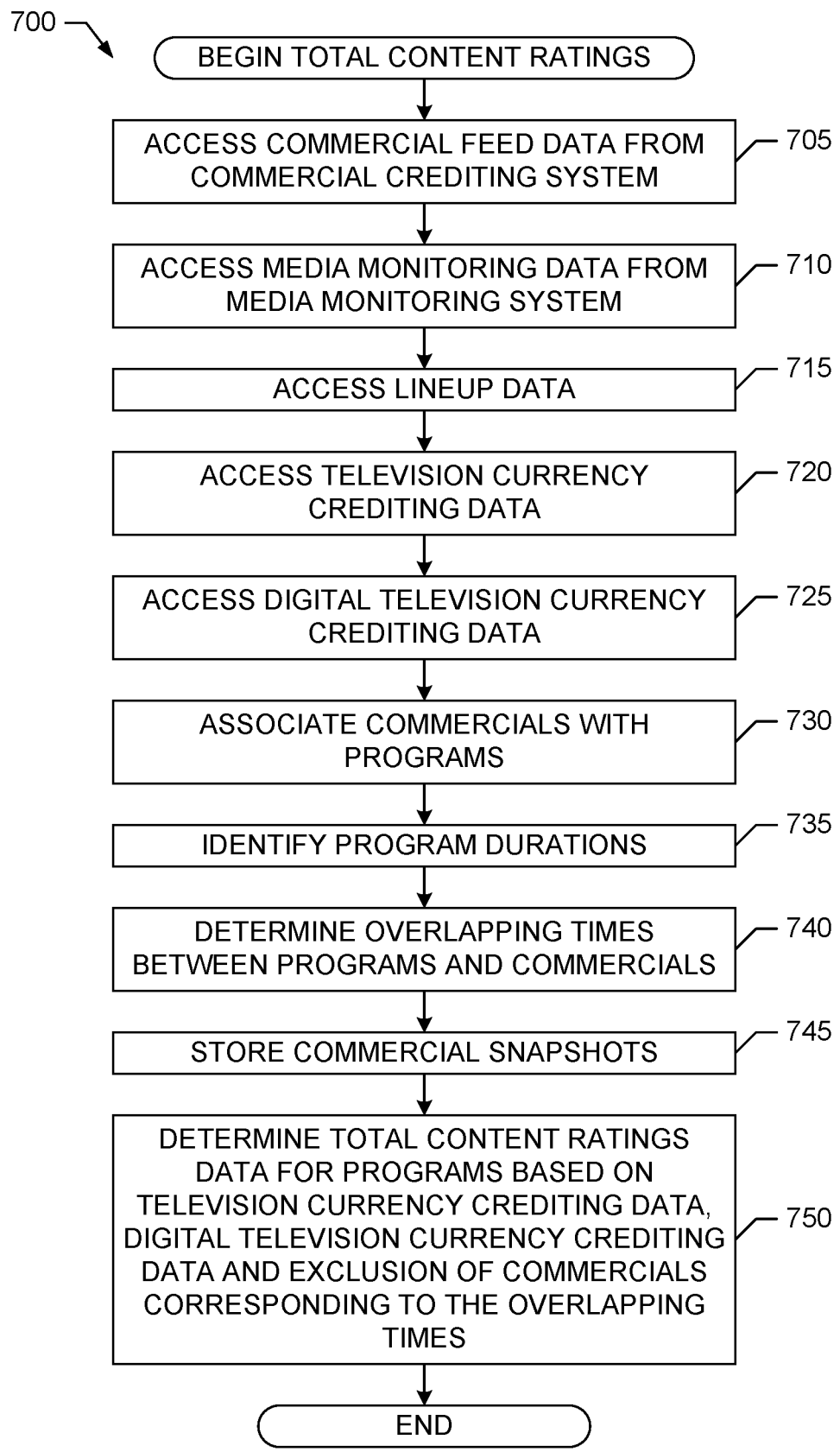
FIG. 7 is a flowchart representative of example machine readable instructions that may be executed to implement the example total content ratings system of FIG. 3.

Flowcharts representative of example machine readable instructions for implementing the example commercial crediting system 100, the example total content ratings system 300, the example commercial monitoring system 105, the example MMS 110, the example lineup server 115, the example commercial creditor 120, the example cable network commercial creditor 125, the example broadcast network commercial creditor 130, the example syndication network commercial creditor 135 and the example commercial repository 140, the example commercial excluder 305, the example AP television metering system(s) 315, the example digital SDK collection systems 325, the example television commercial excluder 330, the example digital television commercial excluder 335 and/or the example total content ratings data mart 340 are shown in FIGS. 6-7. In these examples, the machine readable instructions comprise one or more programs for execution by a processor, such as the processor 812 shown in the example processor platform 800 discussed below in connection with FIG. 8. The one or more programs, or portion(s) thereof, may be embodied in software stored on a tangible computer readable storage medium such as a CD-ROM, a floppy disk, a hard drive, a digital versatile disk (DVD), a Blu-ray disk™, or a memory associated with the processor 812, but the entire program or programs and/or portions thereof could alternatively be executed by a device other than the processor 812 and/or embodied in firmware or dedicated hardware (e.g., implemented by an ASIC, a PLD, an FPLD, discrete logic, etc.). Further, although the example program(s) is(are) described with reference to the flowcharts illustrated in FIGS. 6-7, many other methods of implementing the example commercial crediting system 100, the example total content ratings system 300, the example commercial monitoring system 105, the example MMS 110, the example lineup server 115, the example commercial creditor 120, the example cable network commercial creditor 125, the example broadcast network commercial creditor 130, the example syndication network commercial creditor 135 and the example commercial repository 140, the example commercial excluder 305, the example AP television metering system(s) 315, the example digital SDK collection systems 325, the example television commercial excluder 330, the example digital television commercial excluder 335 and/or the example total content ratings data mart 340 may alternatively be used. For example, with reference to the flowcharts illustrated in FIGS. 6-7, the order of execution of the blocks may be changed, and/or some of the blocks described may be changed, eliminated, combined and/or subdivided into multiple blocks.

As mentioned above, the example processes of FIGS. 6-7 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 6-7 may be implemented using coded instructions (e.g., computer and/or machine readable instructions) stored on a non-transitory computer and/or machine readable medium such as a hard disk drive, a flash memory, a ROM, a CD, a DVD, a cache, a RAM and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the terms "comprising" and "including" are open ended. Also, as used herein, the terms "computer readable" and "machine readable" are considered equivalent unless indicated otherwise.

An example program 600 that may be executed to implement the example commercial crediting system 100 of FIG. 1 is illustrated in FIG. 6. With reference to the preceding figures and associated written descriptions, the example program 600 of FIG. 6 begins execution at block 605 at which the example commercial creditor 120 accesses the commercial crediting feed provided by the example commercial monitoring system 105. At block 610, the commercial creditor 120 begins determining crediting data for each monitored commercial included in the accesses commercial crediting feed. For example, at block 615 the commercial creditor 120 determines (e.g., based on the ORIGINATOR_TYPE_CODE included in the commercial crediting feed data) the distribution network type for the monitored commercial, as described above.

If the monitored commercial was included in a cable network distribution feed (block 620), then the commercial creditor 120 invokes the example cable network commercial creditor 125 to perform processing at block 625 and 630. For example, at block 625, the cable network commercial creditor 125 uses, as described above, the accessed commercial crediting feed (e.g., without accessing the MMS data provided by the example MMS 110) to identify the monitored commercial (and any associated attribute data) from published lineup data stored in the example lineup server 115 and to determine the crediting data for the monitored commercial. In some examples, at block 630, the cable network commercial creditor 125 also identifies, from the published lineup data, any program content adjacent to the monitored commercial, as described above. At block 635, the commercial creditor 120 stores the commercial crediting data for the monitored commercial in the commercial repository 140.

However, if the monitored commercial was not included in a cable network distribution feed (block 620), then the commercial creditor 120 invokes the example broadcast network commercial creditor 130 to perform processing at block 640-655. For example, at block 640, the broadcast network commercial creditor 130 accesses MMS data provided by the example MMS 110. At block 645, the broadcast network commercial creditor 130 identifies, as described above, the broadcast distribution feed corresponding to the commercial crediting feed data for the monitored commercial (e.g., by comparing TOWER ID data in the commercial crediting feed data to connection point data in the MMS data). At block 650, the broadcast network commercial creditor 130 uses, as described above, the accessed MMS data for the identified broadcast distribution feed data to identify the monitored commercial (and any associated attribute data) from published lineup data stored in the example lineup server 115 and to determine the crediting data for the monitored commercial. In some examples, at block 630, the broadcast network commercial creditor 130 also identifies, from the published lineup data, any program content adjacent to the monitored commercial, as described above. At block 635, the commercial creditor 120 stores the commercial crediting data for the monitored commercial in the commercial repository 140.

At block 660, the commercial creditor 120 determines whether crediting data for all of the monitored commercials included in the commercial crediting feed data has been determined. If determination of the commercial crediting data is not complete, processing returns to block 610 and blocks subsequent thereto. Otherwise, execution of the example program 600 ends.

An example program 700 that may be executed to implement the example total content ratings system 300 of FIG. 3 is illustrated in FIG. 7. With reference to the preceding figures and associated written descriptions, the example program 700 of FIG. 7 begins execution at block 705 at which the example commercial creditor 120 accesses the commercial crediting feed provided by the example commercial monitoring system(s) 105, as described above. At block 710, the example commercial creditor 120 accesses media monitoring data provided by the example MMS(s) 110, as described above. At block 715, the example commercial creditor 120 accesses the lineup data stored in the example lineup server 115, as described above. At block 720, the example commercial excluder 305 accesses the example television currency crediting data 310 provided by, for example, the example AP television metering system(s) 315, as described above. At block 725, the example commercial excluder 305 accesses the example digital television currency crediting data 320 provided by, for example, the example digital SDK collection system(s) 325, as described above.

At block 730, the example commercial creditor 120 determines crediting data for the monitored commercials included in the accesses commercial crediting feed and associates the monitored commercials with adjacent program content in the accessed lineup data, as described above. At blocks 735 and 740, the commercial excluder 305 identifies durations of the adjacent programs from the accessed television currency crediting data 310 and the accessed digital television currency crediting data 320, and determines the overlapping times between the programs and the monitored commercials. In some examples, at block 745, the commercial creditor 120 stores commercial snapshots for the monitored commercial data, in addition to the crediting data for the monitored commercials, in the example commercial repository 140. At block 750, the commercial excluder 305 determines, as described above, total content ratings for the monitored programs from the accessed television currency crediting data 310 and the accessed digital television currency crediting data 320, and by excluding the monitored commercials that overlapped with the program content. Execution of the example program 700 then ends.

Figure 8:
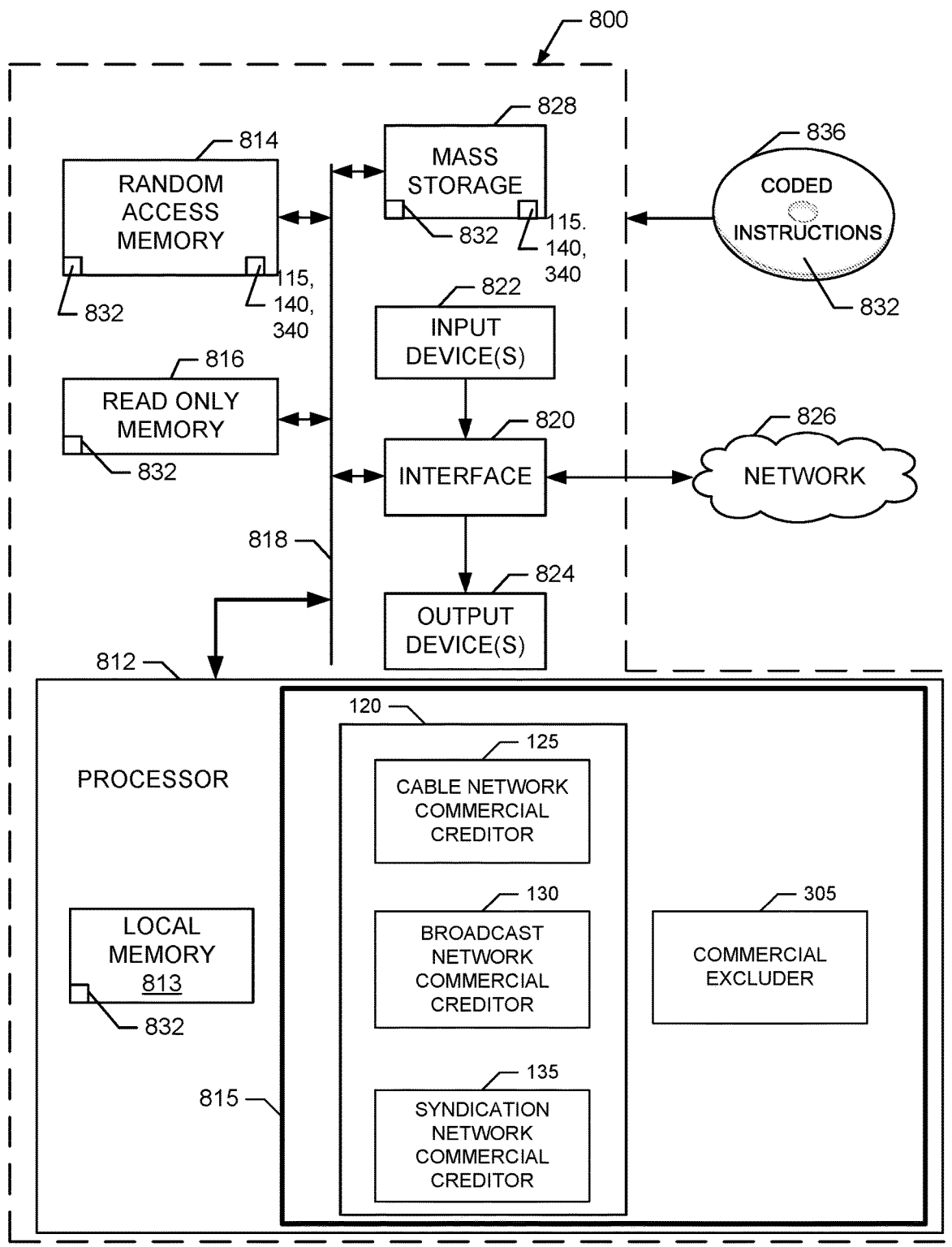
FIG. 8 is a block diagram of an example processor platform structured to execute the example machine readable instructions of FIGS. 6 and/or 7 to implement the example commercial crediting system of FIG. 1 and/or the example total content ratings system of FIG. 3.

FIG. 8 is a block diagram of an example processor platform 800 structured to execute the instructions of FIGS. 6 and/or 7 to implement the example commercial crediting system 100 of FIG. 1 and/or the example total content ratings system 300 of FIG. 3. The processor platform 800 can be, for example, a server, a personal computer, a mobile device (e.g., a cell phone, a smart phone, a tablet such as an iPad™), or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 includes one or more example processing cores 815 configured via example instructions 832, which include the example instructions of FIGS. 6 and/or 7, to implement the example commercial creditor 120, the example cable network commercial creditor 125, the example broadcast network commercial creditor 130, the example syndication network commercial creditor 135 and/or the example commercial excluder 305 of FIGS. 1 and/or 3.

The processor 812 of the illustrated example includes a local memory 813 (e.g., a cache). The processor 812 of the illustrated example is in communication with a main memory including a volatile memory 814 and a non-volatile memory 816 via a link 818. The link 818 may be implemented by a bus, one or more point-to-point connections, etc., or a combination thereof. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface.

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 800, can allow the user to control the computer system and provide data to the computer using physical gestures, such as, but not limited to, hand or body movements, facial expressions, and face recognition.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID (redundant array of independent disks) systems, and digital versatile disk (DVD) drives. In some examples, the mass storage device 830 may implement the example lineup server 115, the example commercial repository 140 and/or the example total content ratings data mart 340 of FIGS. 1 and/or 3. Additionally or alternatively, in some examples, the volatile memory 818 may implement the example lineup server 115, the example commercial repository 140 and/or the example total content ratings data mart 340 of FIGS. 1 and/or 3.

Coded instructions 832 corresponding to the instructions of FIGS. 6 and/or 7 may be stored in the mass storage device 828, in the volatile memory 814, in the non-volatile memory 816, in the local memory 813 and/or on a removable tangible computer readable storage medium, such as a CD or DVD 836.

It is noted that this patent claims priority from Indian Patent Application Number 3858/DEL/2015, which was filed on Nov. 26, 2015, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A commercial crediting method comprising:

detecting, within a network feed, codes to obtain media monitoring system data;

accessing, by a processor, commercial crediting feed data corresponding to a first monitored commercial;

in response to determining the first monitored commercial was distributed via a broadcast network and not a cable network, (1) comparing, by executing an instruction with the processor, the commercial crediting feed data to the media monitoring system data to identify a code of the codes included in the network feed to identify the first monitored commercial, and (2) comparing, by executing an instruction with the processor, the code to first lineup data to identify crediting data for the first monitored commercial, wherein the comparing of the code to the first lineup data further includes:

identifying a first media program listed in the first lineup data adjacent to the first monitored commercial identified by the code; and adjusting a duration of the first media program based on a duration of the first monitored commercial; and storing, by the processor, the crediting data for the first monitored commercial in a data repository.

2. The commercial crediting method of claim 1, further including, in response to determining the first monitored commercial was distributed via a cable network, comparing the commercial crediting feed data to second lineup data without accessing the media monitoring system data to identify the crediting data for the first monitored commercial.

3. The commercial crediting method of claim 1, wherein the media monitoring system data includes a mapping between final distributor codes and original distributor codes, the code included in the network feed is a first original distributor code corresponding to the first monitored commercial, and the comparing of the commercial crediting feed data to the media monitoring system data includes:

comparing first identification information and first time information included in the commercial crediting feed data with second identification information and second time information included in the media monitoring system data to identify a first final distributor code corresponding to the first monitored commercial; and examining the mapping between the final distributor codes and the original distributor codes using the first final distributor code to identify the first original distributor code.

4. The commercial crediting method of claim 3, wherein the final distributor codes and the original distributor codes are included in final distributor media distribution feeds in a hierarchical manner, and further including detecting the final distributor codes and the original distributor codes included in the final distributor media distribution feeds to determine the mapping between the final distributor codes and the original distributor codes.

5. The commercial crediting method of claim 1, further including examining an originator type code included in the commercial crediting feed data corresponding to the first monitored commercial to determine whether the first monitored commercial was distributed via a broadcast network or a cable network.

6. The commercial crediting method of claim 1, wherein the network feed is used to provide the first monitored commercial from an original distributor to a final distributor, and the first lineup data is provided by the original distributor.

7. The commercial crediting method of claim 1, wherein the comparing of the code to the first lineup data further includes:

obtaining the duration of the first monitored commercial from the commercial crediting feed data.

8. A tangible computer readable storage medium comprising computer readable instructions that, when executed, cause a processor to at least:

detect, within a network feed, codes to obtain media monitoring system data;

access commercial crediting feed data corresponding to a first monitored commercial;

in response to determining the first monitored commercial was distributed via a broadcast network and not a cable network, (1) compare the commercial crediting feed data to the media monitoring system data to identify a code of the codes included in the network feed to identify the first monitored commercial, and (2) compare the code to first lineup data to identify crediting data for the first monitored commercial, identify a first media program listed in the first lineup data adjacent to the first monitored commercial identified by the code;

adjust a duration of the first media program based on a duration of the first monitored commercial; and store the crediting data for the first monitored commercial in a data repository.

9. The tangible computer readable storage medium of claim 8, wherein the instructions, when executed, further cause the processor to, in response to determining the first monitored commercial was distributed via a cable network, compare the commercial crediting feed data to second lineup data without accessing the media monitoring system data to identify the crediting data for the first monitored commercial.

10. The tangible computer readable storage medium of claim 8, wherein the media monitoring system data includes a mapping between final distributor codes and original distributor codes, the code included in the network feed is a first original distributor code corresponding to the first monitored commercial, and to compare the commercial crediting feed data to the media monitoring system data, the instructions, when executed, cause the processor to:

compare first identification information and first time information included in the commercial crediting feed data with second identification information and second time information included in the media monitoring system data to identify a first final distributor code corresponding to the first monitored commercial; and examine the mapping between the final distributor codes and the original distributor codes using the first final distributor code to identify the first original distributor code.

11. The tangible computer readable storage medium of claim 10, wherein the final distributor codes and the original distributor codes are included in final distributor media distribution feeds in a hierarchical manner, and the instructions, when executed, further cause the processor to detect the final distributor codes and the original distributor codes included in the final distributor media distribution feeds to determine the mapping between the final distributor codes and the original distributor codes.

12. The tangible computer readable storage medium of claim 8, wherein the instructions, when executed, further cause the processor to examine an originator type code included in the commercial crediting feed data corresponding to the first monitored commercial to determine whether the first monitored commercial was distributed via a broadcast network or a cable network.

13. The tangible computer readable storage medium of claim 8, wherein the network feed is used to provide the first monitored commercial from an original distributor to a final distributor, and the first lineup data is provided by the original distributor.

14. The tangible computer readable storage medium of claim 8, wherein the instructions, when executed, further cause the processor to:

obtain the duration of the first monitored commercial from the commercial crediting feed data.

15. An apparatus comprising:

a media monitoring system to detect, within a network feed, codes to obtain media monitoring system data;

a first commercial creditor to:
   access commercial crediting feed data corresponding to a first monitored commercial;
   in response to determining the first monitored commercial was distributed via a broadcast network and not a cable network, (1) compare the commercial crediting feed data to the media monitoring system data to identify a code of the codes included in the network feed to identify the first monitored commercial, and (2) compare the code to first lineup data to identify crediting data for the first monitored commercial; and
   identify a first media program listed in the first lineup data adjacent to the first monitored commercial identified by the code;
a commercial excluder to adjust a duration of the first media program based on a duration of the first monitored commercial;
a server to store the first lineup data; and
a data store to store the crediting data for the first monitored commercial.

16. The apparatus of claim 15, further including a second commercial creditor to, in response to determining the first monitored commercial was distributed via a cable network, compare the commercial crediting feed data to second lineup data without accessing the media monitoring system data to identify the crediting data for the first monitored commercial.

17. The apparatus of claim 15, wherein the media monitoring system data includes a mapping between final distributor codes and original distributor codes, the code included in the network feed is a first original distributor code corresponding to the first monitored commercial, and the first commercial creditor is to compare the commercial crediting feed data to the media monitoring system data by:
   comparing first identification information and first time information included in the commercial crediting feed data with second identification information and second time information included in the media monitoring system data to identify a first final distributor code corresponding to the first monitored commercial; and
   examining the mapping between the final distributor codes and the original distributor codes using the first final distributor code to identify the first original distributor code.

18. The apparatus of claim 15, wherein the first commercial creditor is further to examine an originator type code included in the commercial crediting feed data corresponding to the first monitored commercial to determine whether the first monitored commercial was distributed via a broadcast network or a cable network.

19. The apparatus of claim 15, wherein the network feed is used to provide the first monitored commercial from an original distributor to a final distributor, and the first lineup data is provided by the original distributor.

20. The apparatus of claim 15, wherein the commercial excluder is further to:
   obtain the duration of the first monitored commercial from the commercial crediting feed data.

* * * * *